(12) United States Patent
Schuler et al.

(10) Patent No.: US 12,147,457 B2
(45) Date of Patent: Nov. 19, 2024

(54) DETERMINING PRIORITY DISCREPANCIES BETWEEN AUDIO DATA AND RECORDS DATA

(71) Applicant: MOTOROLA SOLUTIONS, INC., Chicago, IL (US)

(72) Inventors: Francesca Schuler, Palatine, IL (US); Min Ma, Lake Zurich, IL (US); Jami Perkins, Danville, CA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/221,336

(22) Filed: Apr. 2, 2021

(65) Prior Publication Data

US 2022/0318278 A1 Oct. 6, 2022

(51) Int. Cl.
| | | |
|---|---|---|
| *G06F 16/00* | (2019.01) | |
| *G06F 7/00* | (2006.01) | |
| *G06F 16/22* | (2019.01) | |
| *G06F 16/28* | (2019.01) | |
| *G06F 16/29* | (2019.01) | |
| *G06F 16/65* | (2019.01) | |
| *G06Q 50/26* | (2012.01) | |

(52) U.S. Cl.
CPC ............ *G06F 16/29* (2019.01); *G06F 16/221* (2019.01); *G06F 16/288* (2019.01); *G06F 16/65* (2019.01); *G06Q 50/26* (2013.01)

(58) Field of Classification Search
CPC ........ G06F 16/29; G06F 16/221; G06F 16/65; G06F 16/288; G06Q 50/26
USPC ...................................................... 707/737
See application file for complete search history.

(56) References Cited

U.S. PATENT DOCUMENTS

| | | |
|---|---|---|
| 8,760,290 B2 | 6/2014 | Piett et al. |
| 10,868,910 B1 | 12/2020 | Massie et al. |
| 2015/0081579 A1* | 3/2015 | Brown .................... H04W 4/02 705/325 |
| 2019/0362523 A1* | 11/2019 | Ngoi ..................... G06T 11/001 |
| 2020/0042945 A1 | 2/2020 | Schuler et al. |
| 2020/0162880 A1* | 5/2020 | Patton ................... H04W 4/029 |
| 2020/0302543 A1 | 9/2020 | Corretjer et al. |
| 2020/0394739 A1* | 12/2020 | Way ....................... G06F 16/955 |
| 2020/0400439 A1* | 12/2020 | Thompson ......... G01C 21/3697 |

(Continued)

OTHER PUBLICATIONS

International Search Report and Written Opinion for Application No. PCT/US2022/071271 dated May 31, 2022 (8 pages).

*Primary Examiner* — Raquel Perez-Arroyo
(74) *Attorney, Agent, or Firm* — Michael Best & Friedrich LLP

(57) ABSTRACT

The present disclosure provides systems and methods for determining priority discrepancies between audio data and records data. In one example, the system includes an electronic computing device. The electronic computing device compares audio data associated with a public safety incident to records data associated with the public safety incident, determines discrepancies between the audio data and the records data, and determines an organization and a type associated with the public safety incident. The electronic computing device also determines, based on the organization and the type, priority discrepancies included in the discrepancies and generates a geographical map that includes the priority discrepancies and that is configured for display on a display device.

20 Claims, 6 Drawing Sheets

(56) References Cited

U.S. PATENT DOCUMENTS

| | | | | |
|---|---|---|---|---|
| 2021/0076186 A1* | 3/2021 | Beemer | .................. | H04W 4/90 |
| 2021/0204108 A1* | 7/2021 | Horelik | .................. | H04W 4/14 |
| 2021/0243294 A1* | 8/2021 | Hassan | ................ | H04W 76/50 |
| 2021/0383918 A1* | 12/2021 | Martin | .................. | G16H 40/67 |

* cited by examiner

| | 302 | 304 | 306 | 308 | |
|---|---|---|---|---|---|
| Command Type | Fire | Fire | Police | Fire | Police |
| Incident Type | | 3-Alarm Fire | Hostage Situation | Arson | Etc. |
| Recommended Radius | | 3 Square Block | 1 Square Block | 3 Square Block | |
| Priority 1. Suspect | | N/A | Suspect Appearance | Suspect Appearance | ••• |
| Priority 2. Community Member(s) Impacted | | Age, Health Condition, Relative Location To Incident | Age, Health Condition | Age, Health Condition, Relative Location To Incident | ••• |
| Priority 3. Community Member(s) Surrounding | | Age, Health Condition, Relative Location To Incident | Age, Health Condition | Age, Health Condition, Relative Location To Incident | ••• |
| Priority 4. Property Impacted | | Structural Information Premise Hazard Data Geographic Information System Data | N/A | Structural Information Premise Hazard Data Geographic Information System Data | ••• |
| Priority 5. Property Surrounding | | Structural Information Premise Hazard Data Geographic Information System Data | | Structural Information Premise Hazard Data Geographic Information System Data | |

FIG. 3

DETERMINING PRIORITY DISCREPANCIES BETWEEN AUDIO DATA AND RECORDS DATA

BACKGROUND OF THE INVENTION

When a public safety incident occurs, a public safety command center typically receives information from numerous and varied sources. The sources of information may include 911 calls, radio communications, and public records. Personnel at the command center may synthesize the information from the various sources to provide correct information to the public safety personnel and first responders at the scene of the public safety incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is an example table illustrating data stored in an agency policy database included in the system of FIG. 1 in accordance with some embodiments.

Figure 1:
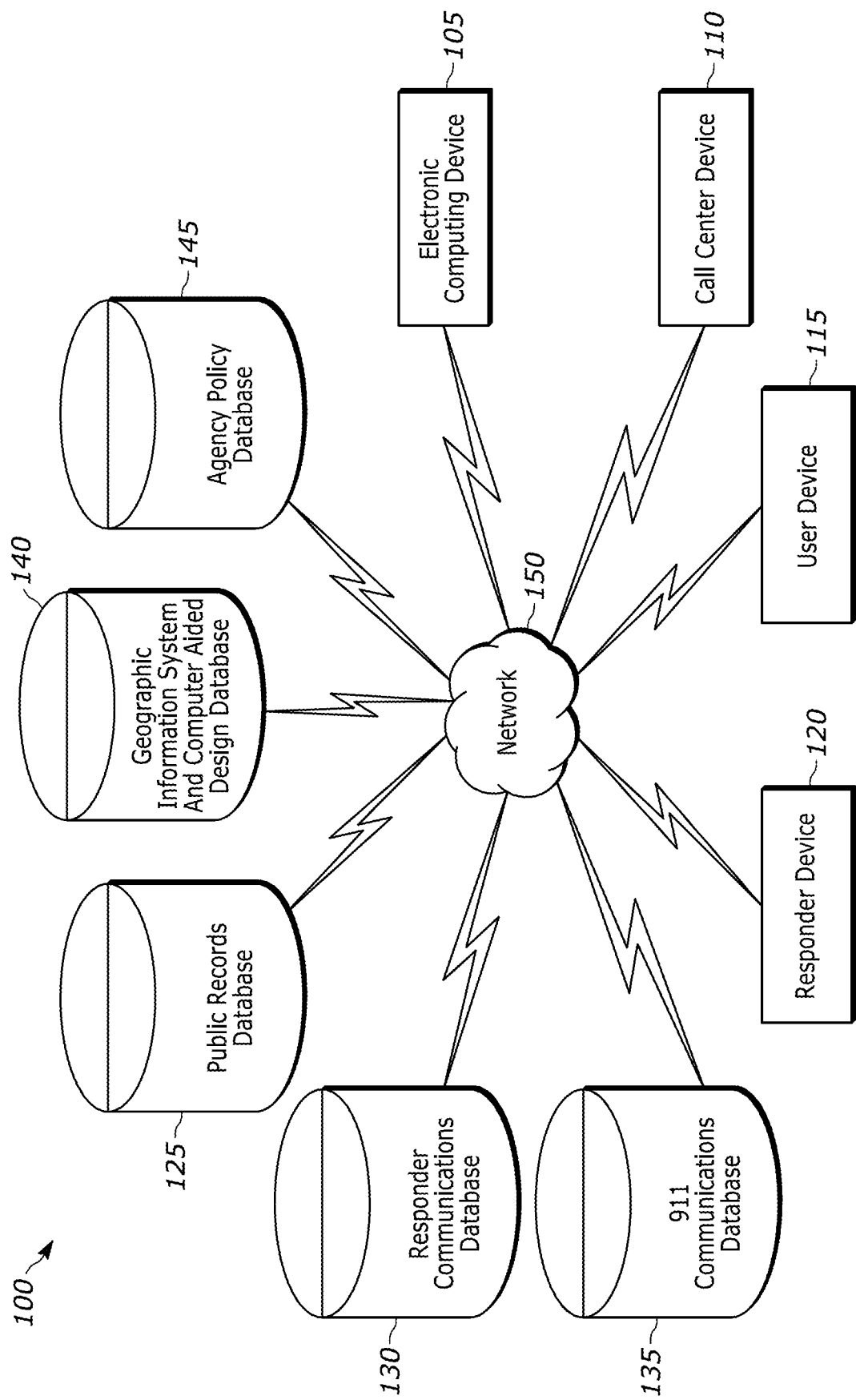
FIG. 1 is a block diagram of an example system for determining priority discrepancies between audio data and records data in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When a public safety incident occurs, information regarding the public safety incident is received by a public safety command center. The information the command center receives may be audio data (for example, in the form of 911 calls or radio communications from first responders to the public safety incident) or public records data (described in more detail below). Personnel at the command center are responsible for attempting to synthesize the information regarding the public safety incident and to use the information to provide useful data and instruction to responders to the public safety incident. Often, personnel at the command center will receive conflicting information. For example, a 911 call may indicate a building has eight stories while city planning records indicate that the building has six stories. Given the amount of information command center personnel receive and the time sensitive nature of public safety incidents, it is often difficult and sometimes impossible for command center personnel to manually synthesize the information they receive and to determine relevant discrepancies in the information.

Therefore, there is a need for a system which synthesizes audio data and records data to determine relevant or priority discrepancies associated with a public safety incident. Whether a discrepancy is relevant or a priority may depend on the type of public safety incident and the preferences of the organization responding to the public safety incident.

Embodiments described herein provide, among other things, a system and method for determining priority discrepancies between audio data and records data. The system and method described herein allow responders to be informed of conflicting information in a timely manner and records data to be updated to resolve conflicting information. Informing responders of conflicting information in a timely manner may save lives because when responders are aware that the information they have is incorrect, they discard or deprecate the incorrect information and proceed based on information that is more reliable and accurate. Additionally, highlighting priority discrepancies allows records data to be updated to correctly reflect reality. Updating records data may result in fewer discrepancies in future public safety incidents.

One example embodiment provides a system for determining priority discrepancies between audio data and records data. The system includes an electronic computing device. The electronic computing device includes an electronic processor and a non-transitory, computer-readable medium storing instructions which, when executed by the electronic processor, perform a set of functions. The set of functions includes comparing audio data associated with a public safety incident to records data associated with the public safety incident, determining discrepancies between the audio data and the records data, and determining an organization and a type associated with the public safety incident. The set of functions also includes determining, based on the organization and the type, priority discrepancies included in the discrepancies and generating a geographical map that includes the priority discrepancies and that is configured for display on a display device.

Another example embodiment provides a method for determining priority discrepancies between audio data and records data. The method includes comparing audio data associated with a public safety incident to records data associated with the public safety incident, determining discrepancies between the audio data and the records data, and determining an organization and a type associated with the public safety incident. The method also includes determining, based on the organization and the type, priority discrepancies included in the discrepancies and generating a geographical map that includes the priority discrepancies and that is configured for display on display device.

FIG. 1 is a block diagram of an example system 100 for determining priority discrepancies between audio data and records data. In the example embodiment illustrated, the system 100 includes an electronic computing device 105, a plurality of user devices (including the call center device 110, the user device 115, and the responder device 120) and a plurality of databases (including a public records database 125, a responder communications database 130, a 911 communications database 135, a geographic information system and computer aided design database 140, and an agency policy database 145). The electronic computing device 105, plurality of user devices, and plurality of databases are connected via a communication network 150. The communication network 150 (which may be an example of an "intervening internet protocol (IP) network") may include wireless and wired portions. In some embodiments, the communication network 150 is implemented using one or more existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) network, and a public switched telephone network. The network 150 may also include future developed networks.

In some embodiments, all or portions of the communication network 150 operate according to an industry standard land mobile radio (LMR) or cellular protocol, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) standard (including LTE-Advanced or LTE-Advanced Pro compliant with, for example, the 3GPP TS 36 specification series), or the 5G standard (including a network architecture compliant with, for example, the 3GPP TS 23 specification series and a new radio (NR) air interface compliant with the 3GPP TS 38 specification series), among other possibilities. The communication network 150 may support the provision of multimedia broadcast multicast services (MBMS), single site point-to-multipoint (SC-PTM) services, or Mission Critical Push-to-talk (MCPTT) services. The communication network 150 may be a network over which an open mobile alliance (OMA) push to talk (PTT) over cellular (OMA-PoC), a voice over IP (VoIP), or a PTT over IP (PoIP) application may be implemented.

In one example, the call center device 110 is located at a 911 call center or a command center. In some embodiments, the call center device 110 is used to analyze communications (for example, a voice call, a video call, text messages, and the like) received from a person (via, for example, a computer having a screen and voice, video, and text capabilities). In some embodiments, the call center device 110 is operated by a 911 dispatcher that receives communications from people who dial or enter 9-1-1 on a user device (for example, the user device 115). For example, the call center device 110 may receive a call from the user device 115 of a remote caller who entered 9-1-1 on the user device 115. The user device 115 is an electronic device (for example, a smart telephone, a laptop computer, a desktop computer, a smart wearable, or other type of electronic device configured to operate as described herein). In some embodiments, the call center device 110 transmits audio data including audio files of 911 calls, text files of transcribed 911 calls, and other information and data to the 911 communications database 135. In some embodiments the call center device automatically transcribes audio data (for example, voice calls, video calls, or both) received from people. In some embodiments, the call center device 110 receives input the 911 dispatcher extracts from the communications received from a person via an input device (for example, a touchscreen, a keyboard, or the like). The input the call center device 110 receives is, for example, text input including pertinent information the 911 dispatcher extracts from 911 communications received from a person. Pertinent information is, for example, a name of the caller, an address associated with the public safety incident, a phone number associated with the caller, a number of occupants of a building, details about the location where the public safety incident is occurring, or the like.

In some embodiments, communications from responder devices (for example, the responder device 120) may be stored in the responder communications database 130. The responder communications database 130 may receive communications from the responder device 120 through one or more intermediary devices. A responder may be medical, fire, or police personnel or other public safety officers in the field, and the responder device 120 may be a mobile device (for example, a wearable computing device, a smart phone, a radio, a computing device installed in a vehicle, or another device).

The public records database 125 may include various public records such as, for example, census data; architectural drawings and blue prints data; construction data; arrest records; water, sewer, and electrical infrastructure data; cell phone data (for example, data that is made available from cell phone providers such as a number of phones associated with a postal address associated with a phone that dialed 9-1-1); voter registration information; genome data; business address and ownership data; Megan's Law registrant data; microchip pet registry data; property records (for example, lot size and details of structures on the property (for example, dimensions, a number of bedrooms, a number of bathrooms, and the like)); business records identifying business owners and employees; internet business data (for example, hours of operation, contact information, and the like); federal public records (for example, court records, license data, inmate data, and the like); county clerk records (for example, birth, death, divorce, and marriage certificates; corporation and business ownership; and the like). It should be understood that the types of public records available for determining priority discrepancies between audio data and records data may be based on local, federal, or state laws or ordinances and individual authorization. In some embodiments, when a public safety incident occurs, a request for permission to access personal information associated with an individual potentially involved in a public safety incident may be sent to one or more electronic user devices associated with the individual.

The geographic information system and computer aided design database 140 may include one or more geographic information system maps of geographic locations, one or more computer aided design maps of geographic locations, or both. Geographic information system maps and computer aided design maps may include geographical positions (for example, coordinates) of natural landmarks (for example, rivers, ponds, caves, cliffs, and the like) and man-made landmarks (for example, roads, buildings, fire hydrants, and the like).

It should be understood that the system 100 may include a different number of each of the components illustrated as being included in the system 100 than the number illustrated in FIG. 1. For example, the system 100 may include a different number of call center devices than the single call center device 110 illustrated in FIG. 1, a different number of user devices than the single user device 115 illustrated in FIG. 1, a different number of responder devices than the single responder device 120 illustrated in FIG. 1, a different number of electronic computing devices than the single electronic computing device 105 illustrated in FIG. 1, and the like. Additionally, it should be understood that the system 100 may include additional databases including different types of information than the types of information described herein. Additionally, the information described herein as being stored in a single database may be stored in multiple databases. For example, genome data may be included in a separate database different from the public records database 125. It should also be understood that the components of the system 100 may communicate with one another via one or more intermediary devices, including those not illustrated in FIG. 1. It should further be understood that the functionality described herein as being performed by one component of the system 100 of FIG. 1 may be performed by a different component of the system 100, including components that are not illustrated in FIG. 1.

Figure 2:
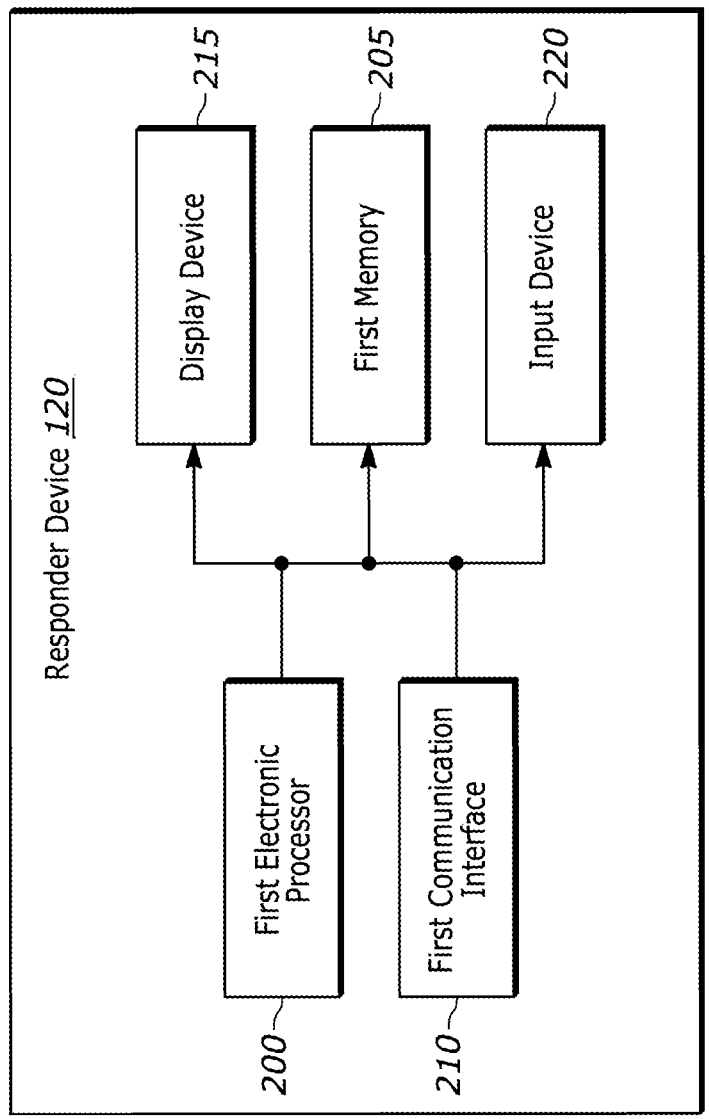
FIG. 2 is a block diagram of an example responder device included in the system of FIG. 1 in accordance with some embodiments.

FIG. 2 is a block diagram of an example of the responder device 120 included in the system 100. In the example illustrated, the responder device 120 includes a first electronic processor 200 (for example, a microprocessor, electronic controller, or another suitable electronic device), a first memory 205 (a non-transitory, computer-readable storage medium), a first communication interface 210 (including, for example, a transceiver for communicating over one or more networks (for example, the communication network 150)), a display device 215, and an input device 220. The first memory 205 may include, for example, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM), a Flash memory, or a combination of the foregoing. The first electronic processor 200, first communication interface 210, first memory 205, display device 215, and input device 220 communicate wirelessly or over one or more communication lines or buses.

The display device 215 may be, for example, a touchscreen, a liquid crystal display ("LCD"), a light-emitting diode ("LED") display, an organic LED ("OLED") display, an electroluminescent display ("ELD"), and the like. The input device 220 may be, for example, a touchscreen (for example, as part of the display device 215), a mouse, a trackpad, a microphone, a camera, or the like. It should be understood that the responder device 120 may include more, fewer, or different components than those components illustrated in FIG. 2. For example, the responder device 120, while illustrated as having only one input device, may include multiple input devices. Also, it should be understood that, although not further described or illustrated herein, the call center device 110 and user device 115 may include same or similar components as the responder device 120.

As described above, the 911 communications database 135 includes audio or text files of 911 communications (for example communications received by the call center device 110). The responder communications database 130 includes communications from responder devices (for example, the responder device 120). The responder communications database 130 includes communications which a responder device sends directly to the responder communications database 130 and communications which responder devices send to one another regarding a public safety incident. For example, the responder communications database 130 may receive radio communications transmitted between radio units in two police cars responding to the same public safety incident. In some embodiments, the agency policy database 145 includes data regarding what priority different types of agencies give to information associated with different types of public safety incidents. FIG. 3 provides an example table 300 illustrating data stored in the agency policy database 145.

In some embodiments, the type associated with the public safety incident is a robbery; a hostage situation; a 1, 2, or 3 alarm fire; a vehicular accident; a traffic stop; arson; a kidnapping; a missing person; and the like). In some embodiments, an organization is a fire department, an emergency medical service, a police department, a search and rescue department, a coast guard department, or the like. The example table 300 illustrated in FIG. 3 includes columns 302, 304, 306, and 308. Column 302 includes information categories such as command type, incident type, and priority rules—for example, suspect, community member(s) impacted, community member(s) surrounding, property impacted, and property surrounding. Priority rules may be established a priori by a responding agency, for example, a police department or fire department. In the example shown, column 304 relates to a 3-alarm fire incident and includes priority information under the community member(s) surrounding rule and the community member(s) impacted rule designating that an age, location relative to the location of the public safety incident, and health condition of individuals impacted by the fire or in the area near the fire is priority information and discrepancies in this information are priority discrepancies. Column 304 also includes priority information under the property impacted rule and property surrounding rule designating that structural information of the buildings impacted by and surrounding the fire, premise hazard data, and geographic information system data are priority information. Column 304 also indicates that discrepancies in this information are priority discrepancies. In some embodiments, premise hazard data includes a known issue associated with the location where the public safety incident is occurring. For example, a known issue may include the presence of toxic chemicals, flammable chemicals, an elderly occupant, a vicious animal, a violent occupant, weapons, a combination of the foregoing, or the like at the location. In some embodiments, geographic information system data includes data regarding infrastructure, buildings, or both at or near the location where the public safety incident is occurring. For example, geographic information system data may include the location of gas pipelines, railroad crossings, and fire hydrants. Additionally, in the example illustrated in column 304 of table 300, the fire department has determined that a geographic area relevant to responding to a 3-alarm fire is within a three block radius of the location of the fire.

Column 306 relates to a hostage situation to which a police department is responding. Column 306 includes priority information under the suspect rule designating that suspect appearance is priority information and discrepancies in this information are priority discrepancies. Column 306 also includes priority information under the community member(s) impacted rule and the community member(s) surrounding rule designating that an age, and health condition of individuals impacted by the hostage situation or in the area near the hostage situation is priority information and discrepancies in this information are priority discrepancies. Additionally, in the example illustrated in column 306 of table 300, the police department has determined that a geographic area relevant to responding to a hostage situation is within a one block radius of the location of the hostage situation. Column 308 relates to an act of arson to which a fire department is responding. Column 308 includes priority information under the suspect rule designating that suspect appearance is priority information and discrepancies in this information are priority discrepancies. Column 308 also includes priority information under the community member(s) impacted rule and the community member(s) surrounding rule designating that an age, a location relative to the location of the public safety incident, and health condition of individuals impacted by the fire or in the area near the fire is priority information and discrepancies in this information are priority discrepancies. Column 308 also includes priority information under the property impacted rule and property surrounding rule designating that structural information of the buildings impacted by and surrounding the fire, premise hazard data, and geographic information system data are priority information and discrepancies in this information are priority discrepancies. Additionally, in the example illustrated in column 308, the fire department has determined that a geographic area relevant to responding to a fire caused by arson is within a three block radius of the location of the fire. In some embodiments, information associated with the geographic area may be the only information compared to determine discrepancies and transmitted to a responder device. It should be understood that the table 300 illustrated in FIG. 3 is just one example of rules and priorities established by a public safety agency. Public safety agencies, municipalities, and other organizations may establish rules and priorities that are different than those shown in FIG. 3. In addition, those entities may assign different priorities to different information based on organization policies and a type of public safety incident.

Figure 4:
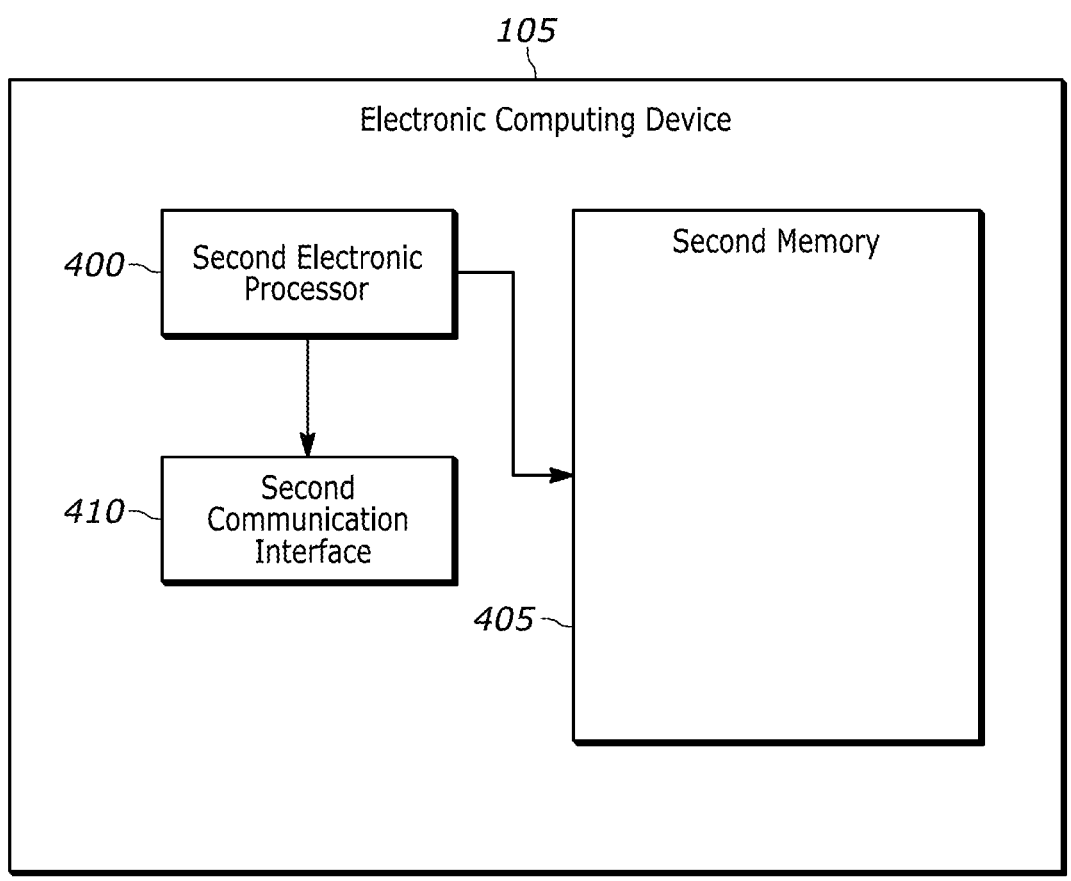
FIG. 4 is a block diagram of an example electronic computing device included in the system of FIG. 1 in accordance with some embodiments.

FIG. 4 is a block diagram of an example of the electronic computing device 105 included in the system 100 of FIG. 1. In the example illustrated, the electronic computing device 105 includes a second electronic processor 400 (for example, one or more of the electronic devices mentioned previously), a second communication interface 410 (including, for example, a transceiver for communicating over one or more networks (for example, the communication network 150)), and a second memory 405 (a non-transitory, computer-readable storage medium). The second memory 405 may include, for example, the types of memory described with respect to the first memory 205. The second electronic processor 400, second communication interface 410, and second memory 405 communicate via one or more of the wired and wireless mechanisms similar to those mentioned previously with respect to FIG. 2. It should be understood that the electronic computing device 105 may include more, fewer, or different components than those components illustrated in FIG. 4.

Figure 5:
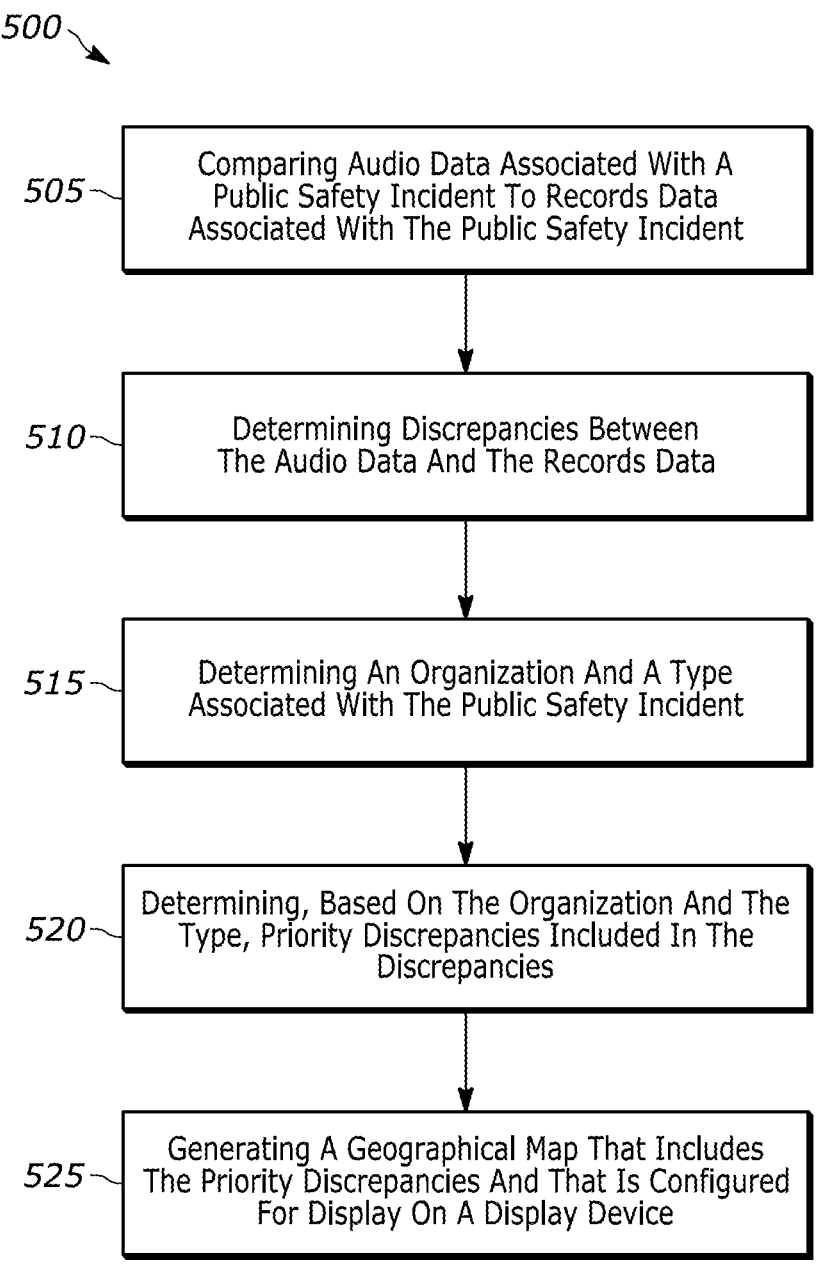
FIG. 5 is a flowchart of an example method for determining priority discrepancies between audio data and records data in accordance with some embodiments.

FIG. 5 is a flowchart of an example method 500 for determining priority discrepancies between audio data and records data. The method 500 begins at block 505, when the second electronic processor 400 compares audio data associated with a public safety incident to records data associated with the public safety incident. The second electronic processor 400 may retrieve the audio data associated with the public safety incident from the responder communications database 130, 911 communications database 135, or both. The audio data may include audio files including 911 or responder communications regarding the public safety incident, text files including 911 or responder communications regarding the public safety incident, or both. In some embodiments, the second electronic processor 400 is configured to automatically transcribe audio files of 911 communications, responder communications, or both. In some embodiments, information including an address associated with the public safety incident, a number of residents at the address, and the like may be parsed from the text files including 911 communications, responder communications, or both.

In some embodiments, the records data the second electronic processor 400 retrieves includes public records from the public records database 125, a geographic information system map from the geographic information system and computer aided design database 140, a computer aided design map from the geographic information system and computer aided design database 140, or a combination of the foregoing. In some embodiments, the second electronic processor 400 uses the information parsed from the 911 communications, responder communications, or both to retrieve records data. For example, the second electronic processor 400 uses an address parsed from 911 communications to retrieve records data associated with the parsed address. The information parsed from the 911 communications, responder communications or both may be compared (via, for example, a string comparison function (for example, string::compare in C++; equals( ), equalsIgnoreCase( ), or compareTo( ) in Java; == or != in Python; strncmp( ) or == in PHP; and the like) relational operators, bitwise operators, or the like) to corresponding information parsed from the records data.

At block 510, the second electronic processor 400 determines discrepancies between the audio data and the records data. For example, if a transcription of a 911 call regarding the public safety incident states that there are three people living in a house but census data in the public records database 125 states there are four people living in the house, the second electronic processor 400 determines there is a discrepancy regarding how many people live in the house.

At block 515, the second electronic processor 400 determines an organization and a type associated with the public safety incident. In some embodiments, the second electronic processor 400 receives a selection of an organization and a type associated with the public safety incident. For example, command or call center personnel may select fire department as the organization and 3-alarm fire as the type of public safety incident via the call center device 110. In some embodiments, the second electronic processor 400 may determine the organization and a type of public safety incident based on keyword information included in 911 communications. For example, if 911 communications associated with a public safety incident include the words smoke, trapped, and fire, the second electronic processor 400 may determine that the organization associated with the public safety incident is a fire department and the type associated with the public safety incident is a 3-alarm fire.

At block 520, the second electronic processor 400 determines, based on the organization and the type, priority discrepancies included in the discrepancies. For example, the second electronic processor 400 retrieves a table (for example, the table 300) specifying which discrepancies are priority discrepancies for an organization and type of public safety incident. For example, in the example table 300 in FIG. 3, a fire department responding to a 3-alarm fire considers discrepancies in the following information to be priority discrepancies: the age, health condition, and location of people at the address of the fire and people at addresses near the location of the fire, structural information of the buildings impacted by and surrounding the fire, premise hazard data, and geographic information system data.

In some embodiments, the second electronic processor 400 determines, based on the organization and the type associated with the public safety incident, a size of a geographic area. In some embodiments, the geographic area includes a place or location where the public safety incident is occurring. For example, in the example table 300 included in FIG. 3, for a 3-alarm fire the geographic area is the area within a 3 block radius of the fire. In some embodiments, at block 510, the second electronic processor 400 determines only discrepancies associated with the geographic area. In some embodiments, at block 505, the second electronic processor 400 compares only audio data and records data associated with the geographic area.

At block 525, the second electronic processor 400 generates a geographical map that includes the priority discrepancies and that is configured for display on a display device. For example, the generated geographical map may be transmitted to a mobile device (for example, the responder device 120) and displayed on the display device of the mobile device (for example, the display device 215). In some embodiments, the responder device 120 is within the geographic area. In some embodiments, the geographical map includes a photograph (for example, a street view photograph, a satellite photograph, or the like), a geographic information system map retrieved by the second electronic processor 400 from the geographic information system and computer aided design database 140, a computer aided design map retrieved by the second electronic processor 400 from the geographic information system and computer aided design database 140, or a combination of the foregoing. In some embodiments, the photograph, geographic information system map, and computer aided design map illustrate the location of the public safety incident. In some embodiments, the photograph, geographic information system map, and computer aided design map illustrate the area surrounding the location of the public safety incident. The size of the surrounding area illustrated in the photograph, geographic information system map, and computer aided design map may be determined by the preferences of the organization (for example, the 3 block, 1 block, and 3 block radiuses in columns 304, 306, and 308, respectively of table 300). In some embodiments, generating the geographical map includes generating a data layer including the priority discrepancies. In some embodiments, the data layer is configured to be overlaid on a photograph, a geographic information system map, a computer aided design map, or a combination of the foregoing when the geographical map is displayed on the display device 215 of the responder device 120.

Figure 6:
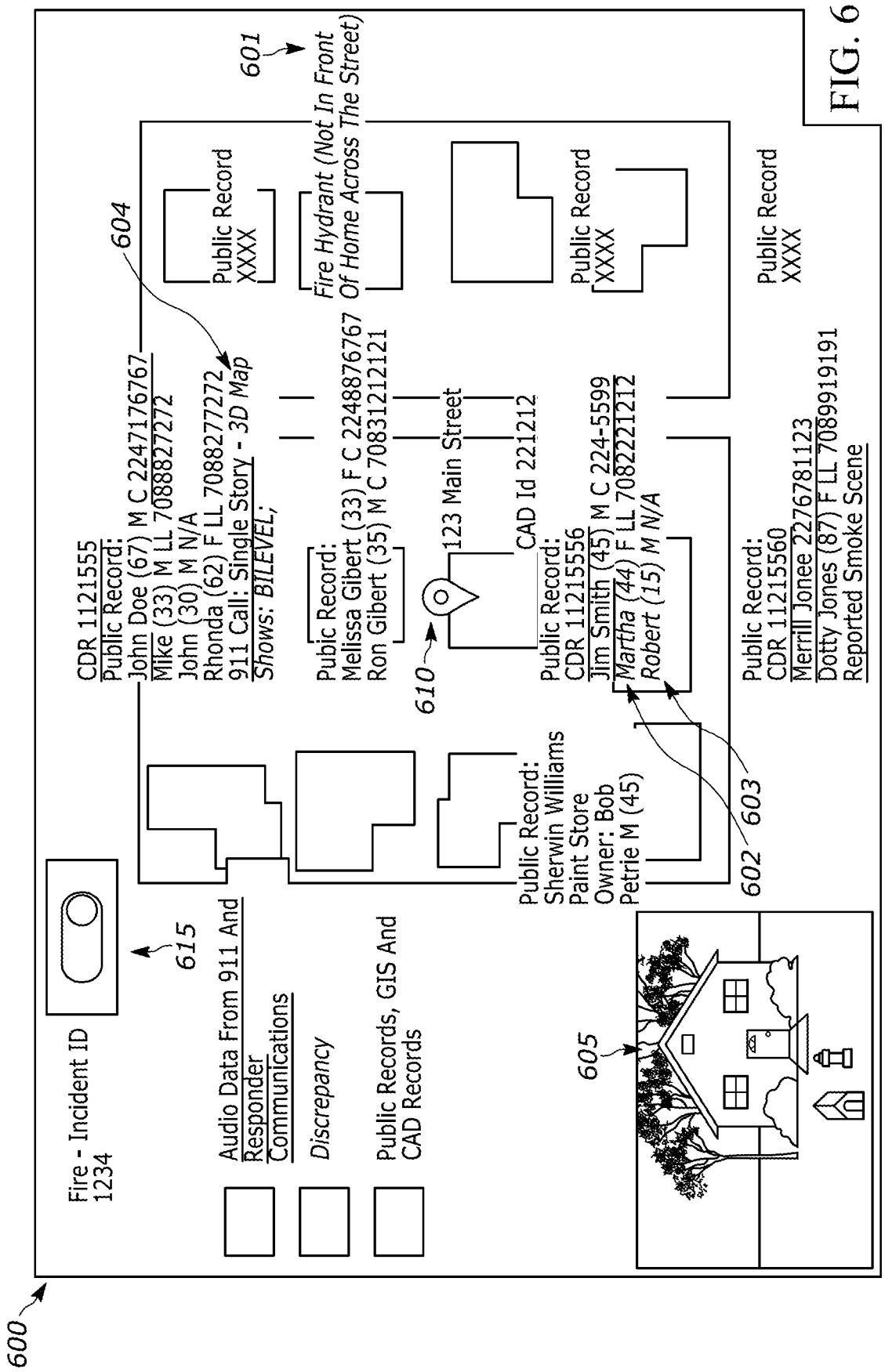
FIG. 6 is an example illustration of a geographical map displayed on a display device in accordance with some embodiments.

FIG. 6 is an example illustration of a geographical map 600 displayed on a display device (for example, the display device 215) of the responder device 120. The geographical map 600 includes a computer aided design map overlaid with a data layer including audio data from 911 and responder communications that have been converted to text, records data, and priority discrepancies. In the geographical map 600, the information extracted from audio data is displayed in underlined text, the information extracted from records data is displayed in plain (neither underlined nor italicized) text, and the priority discrepancies are displayed in italicized text. In other embodiments, information may be displayed in color coded text. For example, the information extracted from audio data may be displayed in yellow text, the information extracted from records data may be displayed in black text, and the priority discrepancies may be displayed in red text. The priority discrepancies illustrated in the geographical map include the location of a fire hydrant (a first priority discrepancy 601), whether a 44 year old named Martha resides with Jim Smith (a second priority discrepancy 602), whether a 15 year old boy named Robert resides with Jim Smith (a third priority discrepancy 603), and whether a building is a split level or a bi-level (a forth priority discrepancy 604). In some embodiments, a photograph of a location of the public safety incident (for example, the photograph 605) is also part of the geographical map 600 and transmitted by the second electronic processor 400 to the responder device 120 for display. In the geographical map 600, the icon 610 indicates that the public safety incident is located at 123 Main Street. In some embodiments, a toggle 615 is displayed alongside the geographical map 600. When the toggle 615 is selected, the data layer including the audio data, records data, and priority discrepancies is either displayed or hidden depending on the position of the toggle. In some embodiments, the audio data, records data, and priority discrepancies are each included in separate data layers and, for each data layer, a toggle associated with the data layer is displayed. For example, a yellow toggle associated with a first data layer including audio data, a black toggle associated with a second data layer including records data, and a red toggle associated with a third data layer including priority discrepancies may be displayed. In one example, when the red toggle is selected, the third data layer including the priority discrepancies is either displayed or hidden depending on the position of the toggle.

In some embodiments, the second electronic processor 400 is configured to determine, based on the organization and the type associated with the public safety incident, high priority discrepancies included in the priority discrepancies. In some embodiments, the high priority discrepancies are highlighted in the geographical map. For example, in the geographical map 600, an icon such as a red flag may be displayed next to the high priority discrepancies, high priority discrepancies may be displayed in a larger font than priority discrepancies, high priority discrepancies may be displayed in a different color than priority discrepancies, or the like.

In some embodiments, the second electronic processor 400 is configured to receive a selection of a priority discrepancy included in the discrepancies for resolution. For example, a responder may select the first priority discrepancy 601 via the input device 220 of the responder device 120. The second electronic processor 400 may flag the selected priority discrepancy for resolution by records management personnel. The records management personnel may resolve selected priority discrepancies by updating public records which require updating.

In some embodiments, the second electronic processor 400 resolves priority discrepancies included in the discrepancies based on additional or further audio data and removes resolved priority discrepancies from the discrepancies. For example, the first priority discrepancy 601 is concerned with whether there is a fire hydrant located across the street from the public safety incident. When radio communication from a fireman is received indicating there is a fire hydrant located across the street from the burning building, the discrepancy regarding the fire hydrant is resolved automatically by the second electronic processor 400 and the geographical map 600 is updated to display, in yellow text, that there is a fire hydrant across the street from the public safety incident.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for generating a geographical map including priority discrepancies, the system comprising:
  an electronic processor, the electronic processor configured to:
    retrieve records data associated with a public safety incident from i) a public records database, ii) a geographic information system and computer aided design database, or both i) and ii);
    determine an organization and a type associated with the public safety incident;
    determine a geographic area, wherein the geographic area surrounds a location where the public safety incident is occurring and is relevant to the organization when the organization responds to the type of public safety incident;
    compare audio data associated with the public safety incident to the records data associated with the public safety incident to determine discrepancies between the audio data and the records data by parsing audio information from the audio data, parsing records information from the records data, and comparing the audio information to the records information, wherein the discrepancies are associated with the geographic area;
    determine, based on the organization and the type, priority discrepancies included in the discrepancies, wherein the priority discrepancies are relevant to the organization when responding to the type of public safety incident, by:
      determining pre-established priority rules corresponding to the organization and the type, wherein the priority rules designate which information, from information associated with the public safety incident, is priority information, and that discrepancies detected in the priority information are priority discrepancies;
    generate a geographical map that is configured for display on a display device and is overlaid with a data layer that includes the priority discrepancies, wherein the priority discrepancies are displayed in the data layer differently than other displayed incident information on the geographical map in order to differentiate the priority discrepancies from the other displayed incident information; and when a selection of a toggle displayed on the display device is received, display or hide the data layer based on a position of the toggle.

2. The system according to claim 1, wherein the electronic processor is configured to determine a geographic area by:
determining, based on the organization and the type associated with the public safety incident, a size of the geographic area.

3. The system according to claim 1, wherein the display device is included in a mobile device within the geographic area.

4. The system according to claim 1, wherein the audio data includes audio files, text files, or both of 911 communications, responder communications, or both.

5. The system according to claim 1, the electronic processor further configured to:
receive a selection of a priority discrepancy included in the discrepancies for resolution; and
flag the selected priority discrepancy for resolution by records management personnel.

6. The system according to claim 1, the electronic processor further configured to:
receive further audio data; and
resolve a priority discrepancy included in the discrepancies based on the further audio data, wherein the resolved priority discrepancy is removed from the discrepancies.

7. The system according to claim 1, the electronic processor further configured to:
determine, based on the organization and the type associated with the public safety incident, high priority discrepancies included in the priority discrepancies; and
highlight the high priority discrepancies in the geographical map.

8. The system according to claim 1, wherein the geographical map is a photograph, a geographic information system map, a computer aided design map, or a combination of the foregoing.

9. The system according to claim 1, wherein the priority rules include at least one selected from the group consisting of a suspect rule, a community member(s) impacted rule, a community member(s) surrounding rule, a property impacted rule, and a property surrounding rule.

10. The system according to claim 1, wherein the records data includes public records, a geographic information system map, a computer aided design map, or a combination of the foregoing.

11. A method for generating a geographical map including priority discrepancies, the method comprising:
retrieving records data associated with a public safety incident from i) a public records database, ii) a geographic information system and computer aided design database, or both i) and ii);
determining an organization and a type associated with the public safety incident;
determining a geographic area, wherein the geographic area surrounds a location where the public safety incident is occurring and is relevant to the organization when the organization responds to the type of public safety incident;
comparing audio data associated with the public safety incident to records data associated with the public safety incident to determine discrepancies between the audio data and the records data by parsing audio information from the audio data, parsing records information from the records data, and comparing the audio information to the records information, wherein the discrepancies are associated with the geographic area;
determining, based on the organization and the type, priority discrepancies included in the discrepancies, wherein the priority discrepancies are relevant to the organization when responding to the type of public safety incident, by:
determining pre-established priority rules corresponding to the organization and the type, wherein the priority rules designate which information, from information associated with the public safety incident, is priority information, and that discrepancies detected in the priority information are priority discrepancies;
generating a geographical map that is configured for display on a display device and is overlaid with a data layer that includes the priority discrepancies, wherein the priority discrepancies are displayed in the data layer differently than other displayed incident information on the geographical map in order to differentiate the priority discrepancies from the other displayed incident information; and
based on a position of a toggle displayed on the display device, display or hide the data layer.

12. The method according to claim 11, wherein determining a geographic area includes:
determining, based on the organization and the type associated with the public safety incident, a size of the geographic area.

13. The method according to claim 11, wherein the display device is included in a mobile device located within the geographic area.

14. The method according to claim 11, wherein the audio data includes audio files, text files, or both of 911 communications, responder communications, or both.

15. The method according to claim 11, the method further comprising:
receiving a selection of a priority discrepancy included in the discrepancies for resolution; and
flagging the selected priority discrepancy for resolution by records management personnel.

16. The method according to claim 11, the method further comprising:
receiving further audio data; and
resolving a priority discrepancy included in the discrepancies based on the further audio data, wherein the resolved priority discrepancy is removed from the discrepancies.

17. The method according to claim 11, the method further comprising:
determining, based on the organization and the type associated with the public safety incident, high priority discrepancies included in the priority discrepancies; and
highlighting the high priority discrepancies in the geographical map.

18. The method according to claim 11, wherein the priority rules include at least one selected from the group consisting of a suspect rule, a community member(s) impacted rule, a community member(s) surrounding rule, a property impacted rule, and a property surrounding rule.

19. The method according to claim 11, wherein the records data includes public records, a geographic information system map, a computer aided design map, or a combination of the foregoing.

20. A system for generating a geographical map including priority discrepancies, the system comprising:
an electronic processor, the electronic processor configured to:
retrieve records data associated with a public safety incident from i) a public records database, ii) a geographic information system and computer aided design database, or both i) and ii);
determine an organization and a type associated with the public safety incident;
determine a geographic area, wherein the geographic area surrounds a location where the public safety incident is occurring and is relevant to the organization when the organization responds to the type of public safety incident;
compare audio data associated with the public safety incident to records data associated with the public safety incident to determine discrepancies between the audio data and the records data by parsing audio information from the audio data, parsing records information from the records data, and comparing the audio information to the records information using one selected from the group consisting of a string comparison function, a relational operator, and a bitwise operator, wherein the audio data includes 911 communications, responder communications, or both, wherein the discrepancies are associated with the geographic area;
determine, based on the organization and the type, priority discrepancies included in the discrepancies, wherein the priority discrepancies are unresolved and are relevant to the organization when responding to the type of public safety incident, by:
determining pre-established priority rules corresponding to the organization and the type, wherein the priority rules designate which information, from information associated with the public safety incident, is priority information, and that discrepancies detected in the priority information are priority discrepancies;
generate a geographical map that is configured for display on a display device and is overlaid with a data layer that includes the priority discrepancies, wherein the priority discrepancies are displayed in the data layer differently than other displayed incident information on the geographical map in order to differentiate the priority discrepancies from the other displayed incident information; and
when a selection of a toggle displayed on the display device is received, display or hide the data layer based on a position of the toggle.

\* \* \* \* \*